(12) United States Patent (10) Patent No.: US 12,691,854 B2
Nohara (45) Date of Patent: Jul. 28, 2026

(54) VEHICLE CONTROL DEVICE

(71) Applicant: TOYOTA JIDOSHA KABUSHIKI KAISHA, Toyota (JP)

(72) Inventor: Takayoshi Nohara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 19/044,888

(22) Filed: Feb. 4, 2025

(65) Prior Publication Data

US 2025/0256689 A1 Aug. 14, 2025

(30) Foreign Application Priority Data

Feb. 14, 2024 (JP) ................................. 2024-020115

(51) Int. Cl.
*B60T 7/22* (2006.01)
*G07C 5/02* (2006.01)
(52) U.S. Cl.
CPC ................. *B60T 7/22* (2013.01); *G07C 5/02* (2013.01); *B60T 2210/32* (2013.01); *B60T 2220/04* (2013.01); *B60T 2250/04* (2013.01); *B60T 2260/00* (2013.01)
(58) Field of Classification Search
CPC .... B60T 7/22; B60T 2210/32; B60T 2220/04; B60T 2250/04; B60T 2260/00; G07C 5/02
See application file for complete search history.

(56) References Cited

U.S. PATENT DOCUMENTS

| 11,932,240 | B2 * | 3/2024 | Mase | .................... B60W 30/09 |
| 12,049,214 | B2 * | 7/2024 | Nakayama | .......... B60T 8/17558 |
| 2015/0166058 | A1 * | 6/2015 | Mizutani | ............... B60W 50/14 |
| | | | | 701/1 |

(Continued)

FOREIGN PATENT DOCUMENTS

| JP | 2000355273 A | * | 12/2000 |
| JP | 2006244395 A | * | 9/2006 |

(Continued)

OTHER PUBLICATIONS

JP-2000355273-A machine translation (Year: 2000).*

(Continued)

*Primary Examiner* — Fadey S. Jabr
*Assistant Examiner* — Mark Robert Heim
(74) *Attorney, Agent, or Firm* — SoraIP, Inc.

(57) ABSTRACT

When it is determined that there is a possibility that an object collides with the vehicle from behind while the vehicle is stopped, collision-corresponding braking control is performed to apply a braking force necessary for suppressing the forward movement of the vehicle due to the collision of the object to the vehicle. During the collision response braking control, it is determined whether or not a backward acceleration caused in the vehicle by the collision of the object has occurred, and in the collision response braking control, when the depression operation of the accelerator pedal is performed while the backward acceleration is occurring, the collision response braking control is continued and the depression operation of the accelerator pedal is not performed.

4 Claims, 4 Drawing Sheets

(56)     References Cited

U.S. PATENT DOCUMENTS

| | | | |
|---|---|---|---|
| 2015/0251638 A1* | 9/2015 | Bogenrieder | B60W 10/18 |
| | | | 701/70 |
| 2016/0375899 A1* | 12/2016 | Takenaka | B60T 7/22 |
| | | | 701/41 |
| 2017/0341612 A1* | 11/2017 | Ohmori | B60R 21/0134 |
| 2019/0366991 A1* | 12/2019 | Tsuchiya | B60T 7/12 |
| 2021/0221364 A1 | 7/2021 | Mase et al. | |
| 2022/0153244 A1 | 5/2022 | Nakayama et al. | |

FOREIGN PATENT DOCUMENTS

| | | | | | |
|---|---|---|---|---|---|
| JP | 2007230500 A | * | 9/2007 | | |
| JP | 2013154760 A | * | 8/2013 | | B60R 16/02 |
| JP | 2018083551 A | * | 5/2018 | | |
| JP | 2022-078475 A | | 5/2022 | | |

OTHER PUBLICATIONS

JP-2006244395-A machine translation (Year: 2006).*
JP-2007230500-A machine translation (Year: 2007).*
JP 2018083551 A machine translation (Year: 2018).*
JP 2013154760 A machine translation (Year: 2013).*

* cited by examiner

VEHICLE CONTROL DEVICE

CROSS-REFERENCE TO RELATED APPLICATION

This application claims priority to Japanese Patent Application No. 2024-020115 filed on Feb. 14, 2024, incorporated herein by reference in its entirety.

BACKGROUND

1. Technical Field

The present disclosure relates to a vehicle control device.

2. Description of Related Art

Post-collision braking control in which a braking force is applied to a host vehicle to decelerate the host vehicle is performed when the host vehicle collides against another vehicle during traveling. This is conventionally performed in order for the host vehicle not to cause secondary collision involving another vehicle in the surroundings. In this case, a configuration is typically employed in which the post-collision braking control is released by stepping an accelerator pedal and the vehicle can be restarted. However, in this case, the post-collision braking control is released and the vehicle is started even when the accelerator pedal is stepped against a driver's intension due to sudden deceleration at the time of the collision, which is not preferable. Therefore, a vehicle control device adapted such that when a driver steps an accelerator pedal twice to a predetermined depth such that a vehicle can be started by a driver's intention, post-collision braking control is released and the vehicle can be started is known (see Japanese Unexamined Patent Application Publication No. 2022-78475 (JP 2022-78475 A), for example).

SUMMARY

However, the configuration in which the vehicle cannot be started without the driver stepping the accelerator pedal twice to the predetermined depth as in the known vehicle control device described above has not only a problem that it is complicated for the driver. It also has a problem that the driver cannot start the vehicle immediately when the driver desires to start the vehicle in the case of the configuration in which the vehicle cannot be started without stepping the accelerator pedal twice. Note that the known vehicle control device described above is intended for a case in which the host vehicle collides against another vehicle during traveling and is basically different from the disclosure of the present application that is intended for a case in which there is a probability of collision of an object against a vehicle from a rear side during stop of the vehicle.

In order to solve such a problem, according to the present disclosure, there is provided a vehicle control device including: an accelerator pedal that is for adjusting a driving force of a vehicle; an acceleration sensor that is able to detect an acceleration of the vehicle in a front-rear direction; a detection sensor that is able to detect an approach of an object from a rear side to the vehicle; a braking device that applies a braking force to the vehicle; and a processor, in which the processor causes the braking device to perform collision handling braking control of applying a braking force necessary to reduce forward movement of the vehicle due to collision of an object to the vehicle when it is determined that there is a probability of collision of the object against the vehicle from the rear side during stop of the vehicle based on a detection result of the detection sensor, determines whether or not a backward acceleration triggered in the vehicle by the collision of the object has occurred during the collision handling braking control, and maintains the collision handling braking control and cancels out an operation of stepping the accelerator pedal when the operation of stepping the accelerator pedal is performed with the backward acceleration having occurred during the collision handling braking control, or releases the collision handling braking control and adjusts the driving force of the vehicle in accordance with the operation of stepping the accelerator pedal when the operation of stepping the accelerator pedal is performed with the backward accelerator having not occurred during the collision handling braking control.

It is possible to immediately start a vehicle in accordance with a driver's intension even during collision handling braking control of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
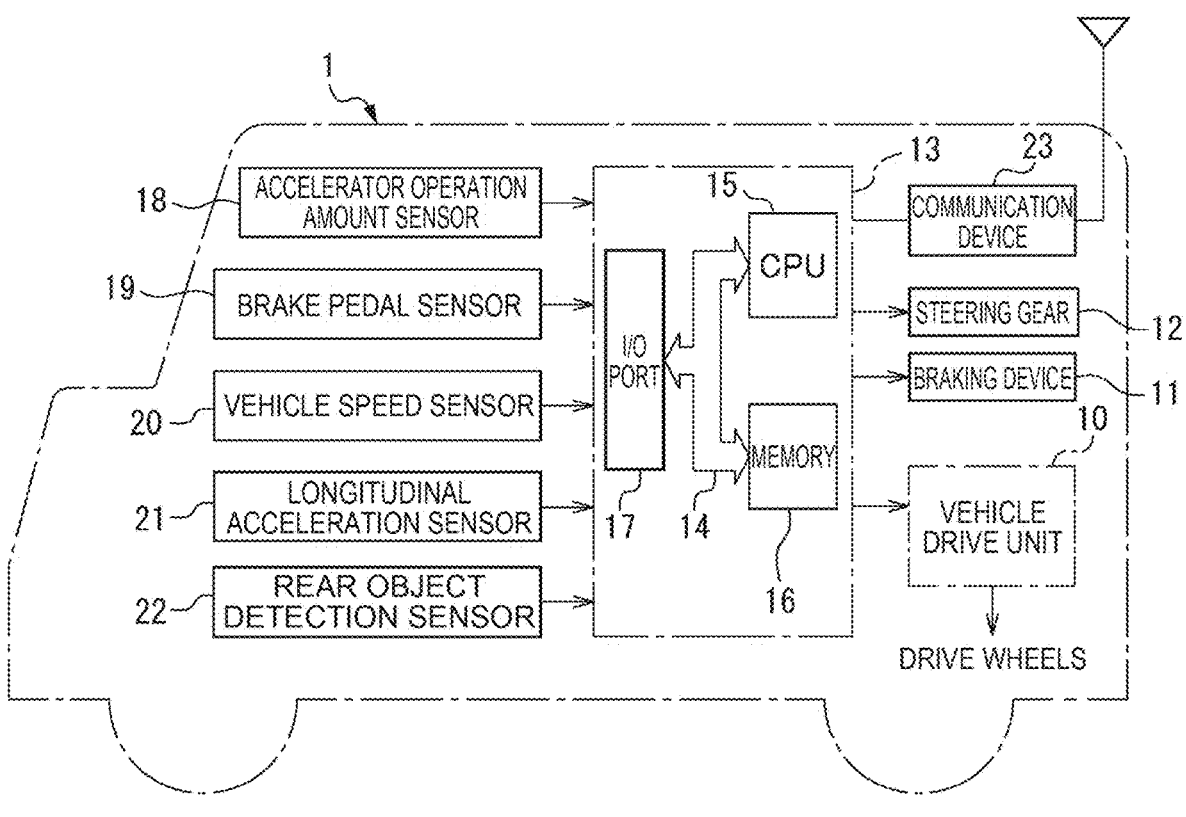
FIG. 1 is a diagram illustrating a functional configuration of a vehicle.

FIG. 1 shows a functional configuration of a vehicle 1. The vehicle 1 is capable of either manual driving or automatic driving. Referring to FIG. 1, reference numeral 10 denotes a vehicle driving unit for applying a driving force to the driving wheels of the vehicle 1, 11 denotes a braking device for braking the vehicle 1, 12 denotes a steering device for steering the vehicle 1, and 13 denotes an electronic control unit mounted in the vehicle 1. As shown in FIG. 1, the electronic control unit 13 consists of a digital computer and includes a CPU (processor) 15, a memory 16 consisting of a ROM and a RAM and an input/output 17 connected to each other by a bi-directional buss 14.

On the other hand, in the vehicle 1, various sensors necessary for driving the vehicle are installed. That is, in the example illustrated in FIG. 1, an accelerator pedal depression amount sensor (hereinafter referred to as an accelerator operation amount sensor) 18 that generates an output signal corresponding to the depression amount of the accelerator pedal is installed in the vehicle 1. In the example shown in FIG. 1, the vehicle 1 is provided with a brake pedal sensor 19 that generates an output signal corresponding to the depression pressure of the brake pedal, and a vehicle speed sensor 20 that detects the vehicle speed of the vehicle 1. In the example shown in FIG. 1, the vehicle 1 is provided with a longitudinal acceleration sensor 21 capable of detecting an acceleration in the front-rear direction of the vehicle 1, and a rear object detection sensor 22 capable of detecting an approach of an object behind the vehicle 1, for example, a vehicle or a motorcycle. As the rear object detection sensor 22, an intermediate-distance millimeter-wave radar which is attached to the rear of the vehicle 1 and emits millimeter waves toward the rear of the vehicle 1, or a clearance sonar which is attached to the rear of the vehicle 1 and emits ultrasonic waves toward the rear of the vehicle 1 is used. Output signals from the accelerator operation amount sensor 18, the brake pedal sensor 19, the vehicle speed sensor 20, the longitudinal acceleration sensor 21, and the rear object detection sensor 22 are input to the electronic control unit 13. A communication device 23 for communicating with the outside is connected to the electronic control unit 13.

In the example shown in FIG. 1, the vehicle drive unit 10 of the vehicle 1 is constituted by an electric motor driven by a secondary battery or an electric motor driven by a fuel cell. When the accelerator pedal is depressed, an output signal corresponding to the depression amount of the accelerator pedal is input from the accelerator operation amount sensor 18 to the electronic control unit 13. At this time, a drive signal of the electric motor corresponding to the depression amount of the accelerator pedal is output from the electronic control unit 13, and the drive wheels are driven and controlled by the electric motor in accordance with the drive signal of the electric motor.

Each wheel of the vehicle 1 is provided with a brake device operated by hydraulic pressure, for example, a disc brake, and the braking device 11 includes a hydraulic pressure control unit for controlling the brake hydraulic pressure supplied to the brake devices. When the brake pedal is depressed, an output signal corresponding to the depressing force of the brake pedal is input from the brake pedal sensor 19 to the electronic control unit 13. At this time, a brake hydraulic pressure signal corresponding to the depressing force of the brake pedal is output from the electronic control unit 13, and the brake hydraulic pressure signal is input to the hydraulic control unit of the braking device 11 to control the braking operation by each brake device. In the example shown in FIG. 1, the hydraulic control unit also has a function of controlling the brake hydraulic pressure to a preset brake hydraulic pressure higher than the brake hydraulic pressure corresponding to the depression force of the brake pedal. On the other hand, the steering device 12 has a power steering function of assisting the rotation of the steering wheel in accordance with the operation of the steering wheel.

In the present disclosure, when it is determined that there is a possibility that an object, for example, a vehicle or a motorcycle, collides with the vehicle 1 from behind while the vehicle 1 is stopped, collision-corresponding braking control is performed to apply a braking force necessary for suppressing the forward movement of the vehicle 1 due to the collision of the object to the vehicle 1. The vehicle 1 can be immediately started in accordance with the driver's intention even when the collision response braking control is performed on the vehicle 1. Therefore, with reference to FIG. 2 showing a time chart of a change in the related parameter in a case where an object collides with the vehicle 1 at a stop from behind, the problem to be solved by the present disclosure and the solving means for the problem will be described first.

Figure 2:
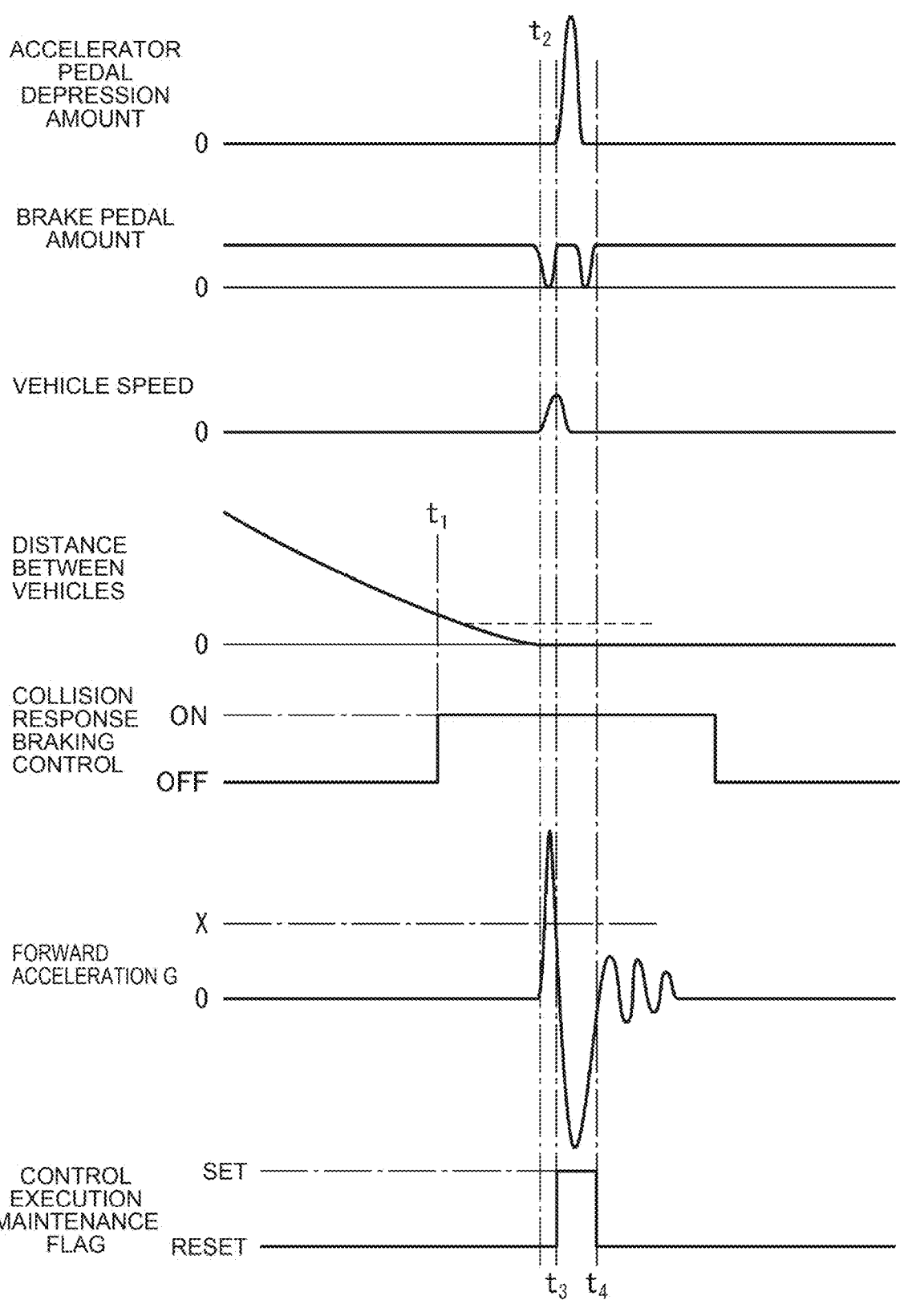
FIG. 2 is a time chart of relevant parameter changes when an object collides with a vehicle at a stop from behind.

Referring to FIG. 2, in order from the top, a change in the amount of depression of the accelerator pedal, a change in the amount of depression of the brake pedal, a change in the vehicle speed, a change in the inter-vehicle distance between the vehicle 1 and an object (for example, a vehicle or a motorcycle) traveling following the vehicle 1, and an OFF for automatically applying a braking force to the vehicle 1 are displayed in FIG. 2. Alternatively, an indication of ON, a change in the forward acceleration G of the vehicle 1 in the forward direction, and an indication of whether the control execution continuation flag indicating that the execution of the collision-responsive braking control should be continued is reset or set is shown. FIG. 2 shows a case where the amount of depression of the accelerator pedal is zero, the brake pedal is depressed, the vehicle speed is zero, and the vehicle 1 is stopped.

A case where a medium distance millimeter wave radar is used as the rear object detection sensor 22 capable of detecting the approach of an object (for example, a vehicle or a motorcycle) behind the vehicle 1 will be described as an example. A vehicle-to-vehicle distance is calculated from a time period from when the millimeter wave is emitted to when the millimeter wave reflected by the object is received, and a speed of the object is calculated from a temporal change in the vehicle-to-vehicle distance. In the embodiment according to the present disclosure, it is determined in the electronic control unit 13 whether or not there is a possibility that the object collides with the vehicle 1 from the calculated inter-vehicle distance and the calculated speed of the object. FIG. 2 shows a case where it is determined that there is a possibility that an object collides with the vehicle 1 in the time $t_1$. When it is determined that there is a possibility that an object collides with the vehicle 1 in the time $t_1$, the collision response braking control is started as illustrated in FIG. 2. When the collision response braking control is started, the collision response braking control is continuously performed for a predetermined time period except when the collision response braking control is released in the middle.

In FIG. 2, the brake pedal is depressed before the start of the collision response braking control. Therefore, at this time, the hydraulic pressure of the brake device of each wheel is controlled by the hydraulic pressure control unit of the braking device 11 to the hydraulic pressure corresponding to the depression force of the brake pedal. Then, when the collision response braking control is started, the brake hydraulic pressure of the brake device of each wheel is raised by the hydraulic control unit. The brake hydraulic pressure of the brake device of each wheel is controlled to a preset hydraulic pressure higher than the hydraulic pressure corresponding to the depression force of the brake pedal.

On the other hand, in FIG. 2, the vehicle-to-vehicle distance is gradually shortened with the passage of time, and the vehicle-to-vehicle distance becomes zero at the time $t_2$, and the object collides with the vehicle 1. When an object collides with the vehicle 1, the colliding object causes the vehicle 1 to project forward. Therefore, as shown in FIG. 2, even if the forward acceleration G in the forward direction of the vehicle 1 rapidly increases and the collision response braking control is performed, the vehicle 1 moves forward, and as shown in FIG. 2, the vehicle speed temporarily becomes positive. When the vehicle 1 protrudes forward, the driver's foot moves away from the brake pedal because the driver's body is pressed toward the backrest, and as shown in FIG. 2, the depression force of the brake pedal temporarily becomes zero.

When the depression force of the brake pedal temporarily becomes zero, the driver tries to depress the brake pedal in order to prevent the forward movement of the vehicle 1. At this time, since the driver is rolling, as shown in FIG. 2, there is a case where the driver erroneously presses the accelerator pedal as the brake pedal. On the other hand, when the object collides with the vehicle 1 and the forward acceleration G in the forward direction of the vehicle 1 increases abruptly, and the tire of each wheel deforms due to the abrupt forward movement of the vehicle 1, the vehicle body is swung back by the reaction force of the deformation, and the backward acceleration of the vehicle 1 in the backward direction increases abruptly. Here, the time $t_3$ at which the backward acceleration starts to increase substantially coincides with the time at which the driver starts depressing the brake pedal or the time at which the driver starts depressing the accelerator pedal. After a while, at the time $t_4$, a swing-back occurs from the backward acceleration to the forward acceleration G.

As shown in FIG. 2, after the object collides with the vehicle 1, the accelerator pedal depressing operation is performed between the time $t_3$ and the time $t_4$ at which the backward acceleration is generated. Note that, when an actual test is performed, the time $t_3$ when the backward acceleration is approximately generated is between the times $t_4$ after the object collides with the vehicle 1 and the accelerator pedal is depressed.

Incidentally, even when the collision-corresponding braking control is performed on the vehicle 1, it is preferable that the vehicle 1 can be started immediately when the accelerator pedal is depressed by the driver's intention in order to start the vehicle 1. Therefore, in the embodiment according to the present disclosure, the collision response braking control is released when the accelerator pedal is depressed by the driver's intention even while the collision response braking control is being performed. Thus, the driving force of the vehicle 1 can be adjusted in accordance with the depression operation of the accelerator pedal. On the other hand, when there is a high possibility that the depression operation of the accelerator pedal is performed without the intention of the driver, the collision response braking control is continued and the depression operation of the accelerator pedal is not performed.

Here, it is highly likely that the accelerator pedal depressing operation is performed without the intention of the driver during from the time $t_3$ when the backward acceleration is generated after the object collides with the vehicle 1 to the time $t_4$. Therefore, in the embodiment according to the present disclosure, the control execution continuation flag indicating that the execution of the collision-corresponding braking control should be continued during from the time $t_3$ at which the backward acceleration is occurring to the time $t_4$ is set. When the accelerator pedal is also depressed while the control execution continuation flag is set, the collision response braking control is continued and the accelerator pedal is not depressed.

When the rear acceleration generated after the object collides with the vehicle 1 is weak, it is considered that the collision response braking control may be cancelled so that the driving force of the vehicle 1 may be adjusted in accordance with the depression operation of the accelerator pedal. Therefore, in the embodiment according to the present disclosure, it is assumed that the collision response braking control is continued and the accelerator pedal is not depressed only when the rear acceleration generated after the object collides with the vehicle 1 is the rear acceleration equal to or higher than the predetermined intensity. In this case, in the embodiment according to the present disclosure, when the forward acceleration G induced in the vehicle 1 by the collision of the object exceeds the threshold value X, it is determined that the backward acceleration that is subsequently generated is the backward acceleration that is equal to or higher than the predetermined intensity.

Figure 3:
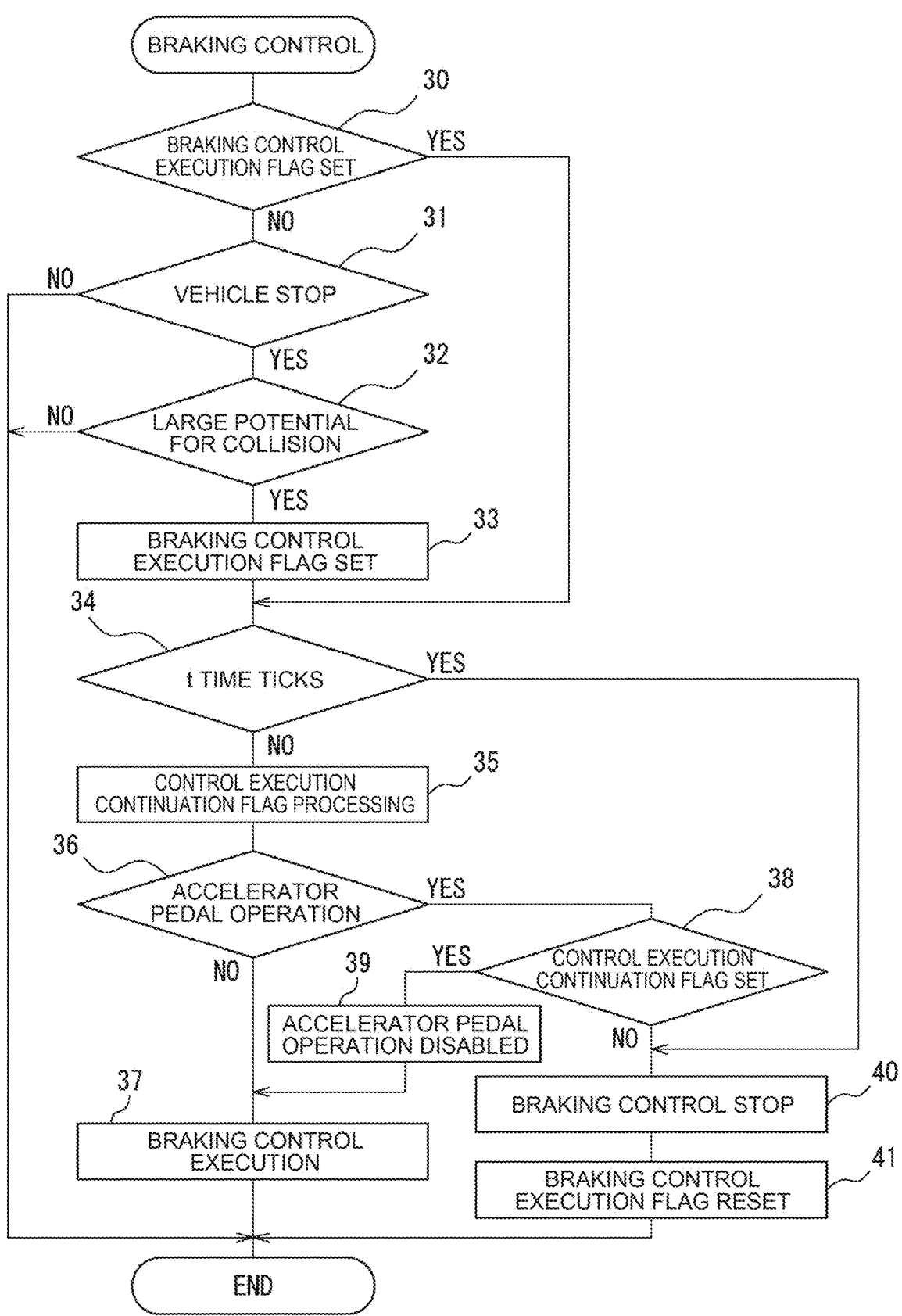
FIG. 3 is a flow chart for performing braking control.

FIG. 3 shows a routine for carrying out a collision-responsive braking control according to the disclosure. This routine is repeatedly executed in the electronic control unit 13 of the vehicle 1.

Referring to FIG. 3, first, in step 30, it is determined whether the braking control execution flag set when the collision response braking control is to be executed is set. When it is determined that the braking control execution flag is not set, the process proceeds to step 31, and it is determined whether or not the vehicle 1 is stopped based on the output signal from the vehicle speed sensor 20. When it is determined that the vehicle 1 is not stopped, the processing cycle is ended. On the other hand, when it is determined that the vehicle 1 is stopped, the process proceeds to step 32, and it is determined whether or not there is a possibility that the object collides with the vehicle 1 from the rear, based on the output signal of the rear object detection sensor 22.

In step 32, when it is determined that there is no possibility that the object collides with the vehicle 1 from behind, the processing cycle is ended. On the other hand, when it is determined that there is a possibility that the object collides with the vehicle 1 from the rear side, the process proceeds to step 33, and the braking control execution flag is set. That is, when the vehicle 1 is stopped and there is a possibility that an object collides with the vehicle 1 from behind, the braking control execution flag is set, and then the process proceeds to step 34. When the brake control execution flag is set, the next processing cycle jumps from step 30 to step 34. In step 34, it is determined whether or not a preset time t has elapsed after the braking control execution flag is set. After the braking control execution flag is set, if it is determined that the preset time t has not elapsed, the process proceeds to step 35, where a control execution continuation flag process indicating that execution of the collision-corresponding braking control should be continued is executed.

Figure 4:
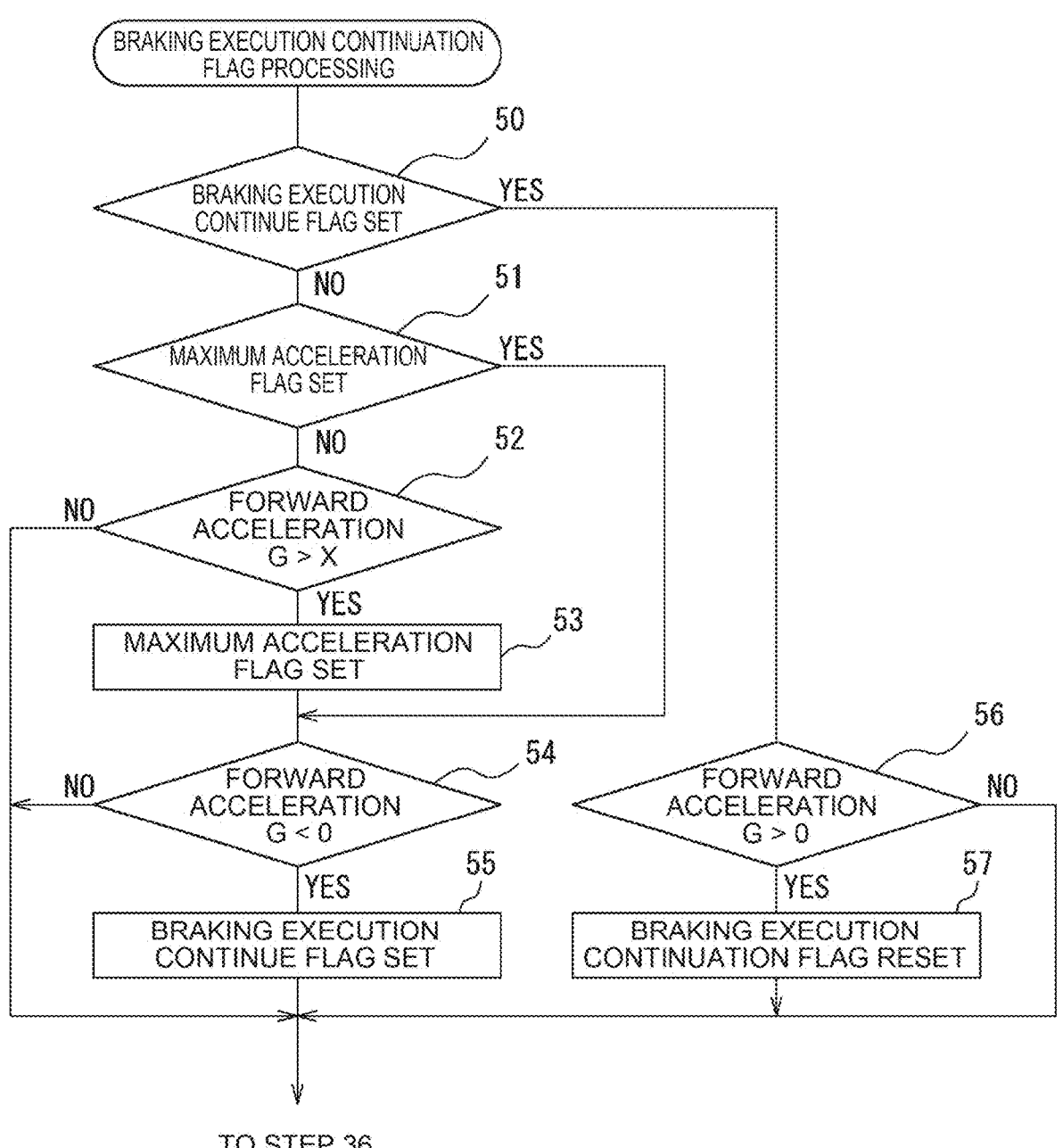
FIG. 4 is a flowchart for executing the control execution continuation flag process illustrated in FIG. 3.

This control execution continuation flag processing is shown in FIG. 4, and therefore, the control execution continuation flag processing shown in FIG. 4 will be described. Referring to FIG. 4, in step 50, it is determined whether or not a control execution continuation flag indicating that execution of the collision response braking control should continue is set. When it is determined that the control execution continuation flag is not set, it is determined whether or not a large acceleration flag indicating that a backward acceleration equal to or higher than a predetermined intensity has occurred is set. When it is determined that the large acceleration flag is not set, the process proceeds to step 52, and it is determined whether or not the generated forward acceleration G exceeds the threshold value X (FIG. 2). When it is determined that the generated forward acceleration G does not exceed the threshold value X, the process proceeds to step 36 of FIG. 3.

On the other hand, when it is determined in step 52 that the generated forward acceleration G exceeds the threshold value X, the process proceeds to step 53, where the maximum acceleration flag is set, and then the process proceeds to step 54. That is, in the embodiment according to the present disclosure, when the forward acceleration G caused by the collision of the object in the vehicle 1 exceeds the threshold value X, it is determined that the backward acceleration that is subsequently generated is the backward acceleration having a predetermined intensity or more, and the large acceleration flag is set when the forward acceleration G exceeds the threshold value X. When the high acceleration flag is set, the next processing cycle jumps from step 51 to step 54.

In step 54, it is determined whether or not the generated forward acceleration G becomes negative, that is, whether or not a backward acceleration has occurred. When it is determined that the backward acceleration has not occurred, the process proceeds to step 36 of FIG. 3. On the other hand, when it is determined that the backward acceleration has occurred, the process proceeds to step 55, where the control execution continuation flag is set, and then the process proceeds to step 36 of FIG. 3. When the control execution continuation flag is set, in the next processing cycle, the process proceeds from step 50 to step 56, and it is determined whether or not the forward acceleration G becomes positive, that is, whether or not the generation of the backward acceleration is completed. When it is determined that the occurrence of the backward acceleration has not been completed, the process proceeds to step 36 of FIG. 3. On the other hand, when it is determined that the generation of the backward acceleration has ended, the process proceeds to step 57, where the control execution continuation flag is reset, and then the process proceeds to step 36 in FIG. 3. Therefore, the control execution continuation flag continues to be set as long as the control execution continuation flag is not reset while the backward acceleration of the predetermined intensity or more is occurring.

Returning again to FIG. 3, in step 36, it is determined whether or not a depression operation of the accelerator pedal has been performed from the output signal of the accelerator operation amount sensor 18. When it is determined that the depression operation of the accelerator pedal is not performed, the process proceeds to step 37, and the collision response braking control is executed. The processing cycle is then terminated. On the other hand, when it is determined in step 36 that the depression operation of the accelerator pedal has been performed, the process proceeds to step 38, and it is determined whether or not the control execution continuation flag to be set is set while the backward acceleration of the predetermined intensity or more is generated. When it is determined that the control execution continuation flag is set, the process proceeds to step 39, and the depression operation of the accelerator pedal is disabled. That is, it is assumed that a depression operation of the accelerator pedal is not performed. Then, the process proceeds to step 37, and the collision response braking control is executed.

On the other hand, when it is determined in step 38 that the control execution continuation flag is not set, the process proceeds to step 40, and the collision response braking control is stopped. At this time, the driving force of the vehicle 1 is adjusted in accordance with the depression operation of the accelerator pedal, and the vehicle 1 is immediately started. Then, in step 41, the braking control execution flag is reset. The processing cycle is then terminated. On the other hand, if it is determined in step 34 that the preset time t has elapsed after the braking control execution flag is set, the process proceeds to step 40, and the collision response braking control is stopped. Then, in step 41, the braking control execution flag is reset.

As described above, the vehicle control device according to the present disclosure includes the accelerator pedal for adjusting the driving force of the vehicle 1, the acceleration sensor 21 capable of detecting the acceleration of the vehicle 1 in the front-rear direction, and the detection sensor 22 capable of detecting the approach of the object from the rear to the vehicle 1. A vehicle control device according to the present disclosure includes a braking device 11 that applies a braking force to a vehicle, and a processor 15. On the basis of the detection result of the detection sensor 22, when it is determined that there is a possibility that an object collides with the vehicle 1 from behind while the vehicle 1 is stopped, the processor 15 causes the braking device 11 to perform collision-corresponding braking control for applying a braking force necessary for suppressing the forward movement of the vehicle due to the collision of the object to the vehicle. Further, the processor 15 determines whether or not a backward acceleration caused by a collision of an object caused by a vehicle has occurred during the collision response braking control. It is assumed that the processor 15 continues the collision response braking control and does not perform the depression operation of the accelerator pedal when the depression operation of the accelerator pedal is performed while the backward acceleration is occurring during the collision response braking control. During the collision response braking control, the processor 15 releases the collision response braking control when the depression operation of the accelerator pedal is performed while the backward acceleration is not occurring, and adjusts the driving force of the vehicle in accordance with the depression operation of the accelerator pedal. In this case, the rear acceleration is a rear acceleration induced in the vehicle 1 first after the forward acceleration induced in the vehicle 1 due to the collision of the object occurs.

Therefore, in the vehicle control device according to the present disclosure, it is possible to immediately start the vehicle 1 according to the driver's intention even during the collision response braking control of the vehicle 1. In this case, in the embodiment according to the present disclosure, when it is determined that there is a possibility that an object collides with the vehicle 1 from behind while the vehicle 1 is stopped based on the detection result of the detection sensor 22, the collision corresponding braking control is performed by the braking device 11 for a predetermined period of time set in advance unless the collision corresponding braking control is released.

In addition, in the embodiment according to the present disclosure, the processor 15 determines whether or not a backward acceleration equal to or higher than a predetermined intensity caused by a collision of an object caused by a vehicle has occurred during the collision response braking control. In the case where the depression operation of the accelerator pedal is performed when the backward acceleration of the predetermined intensity or more occurs during the collision response braking control, the collision response braking control is continued and the depression operation of the accelerator pedal is not performed. When a depression operation of the accelerator pedal is performed when a backward acceleration equal to or higher than a predetermined intensity is not generated during the collision response braking control, the collision response braking control is released and the driving force of the vehicle is adjusted in accordance with the depression operation of the accelerator pedal.

In practice, for example, there is a case where the motorcycle is approached considerably from the rear to the vehicle 1 and then passes through the side of the vehicle 1 without colliding. The change in the inter-vehicle distance indicated by the dashed line in FIG. 2 indicates such a case. In the example shown by the broken line in FIG. 2, the rear object detection sensor 22 determines that there is a possibility that the motorcycle collides with the vehicle 1, and the collision response braking control is started. However, since the motorcycle does not collide with the vehicle 1, the rear acceleration is not caused in the vehicle 1, and therefore, if the depression operation of the accelerator pedal is performed while the collision response braking control is being performed, the collision response braking control is released and the vehicle can be started in accordance with the depression operation of the accelerator pedal. As described above, in a case where the object does not collide with the vehicle 1 even if the collision response braking control is started because there is a possibility that the object collides with the vehicle 1, there is an advantage that the vehicle can be immediately started in accordance with the depression operation of the accelerator pedal.

What is claimed is:

1. A vehicle control device comprising:

an accelerator pedal that is for adjusting a driving force of a vehicle;

an acceleration sensor that is able to detect an acceleration of the vehicle in a front-rear direction;

a detection sensor that is able to detect an approach of an object from a rear side to the vehicle;

a braking device that applies a braking force to the vehicle; and a processor, wherein the processor causes the braking device to perform collision handling braking control of applying a braking force necessary to reduce forward movement of the vehicle due to collision of an object to the vehicle when it is determined that there is a probability of collision of the object against the vehicle from the rear side during stop of the vehicle based on a detection result of the detection sensor, determines whether or not a backward acceleration triggered in the vehicle by the collision of the object has occurred during the collision handling braking control, and maintains the collision handling braking control and cancels out an operation of stepping the accelerator pedal when the operation of stepping the accelerator pedal is performed with the backward acceleration having occurred during the collision handling braking control, or releases the collision handling braking control and adjusts the driving force of the vehicle in accordance with the operation of stepping the accelerator pedal when the operation of stepping the accelerator pedal is performed with the backward accelerator having not occurred during the collision handling braking control.

2. The vehicle control device according to claim 1, wherein when the processor determines that there is a probability of collision of an object against the vehicle from the rear side during stop of the vehicle based on the detection result of the detection sensor, the processor causes the braking device to perform the collision handling braking control for a specific period of time set in advance unless the collision handling braking control is released.

3. The vehicle control device according to claim 1, wherein the processor determines whether or not a backward acceleration that is equal to or greater than a predetermined strength and is triggered in the vehicle by collision of the object has occurred during the collision handling braking control, and maintains the collision handling braking control and cancels out the operation of stepping the accelerator pedal when the operation of stepping the accelerator pedal is performed with the backward accelerator that is equal to or greater than the predetermined strength having occurred during the collision handling braking control, or releases the collision handling braking control and adjusts the driving force of the vehicle in accordance with the operation of stepping the accelerator pedal when the operation of stepping the accelerator pedal is performed with the backward acceleration having not occurring during the collision handling braking control.

4. The vehicle control device according to claim 1, wherein the backward acceleration is a backward acceleration triggered in the vehicle for a first time after a forward acceleration triggered in the vehicle by collision of the object occurs.

* * * * *